Figure 1:
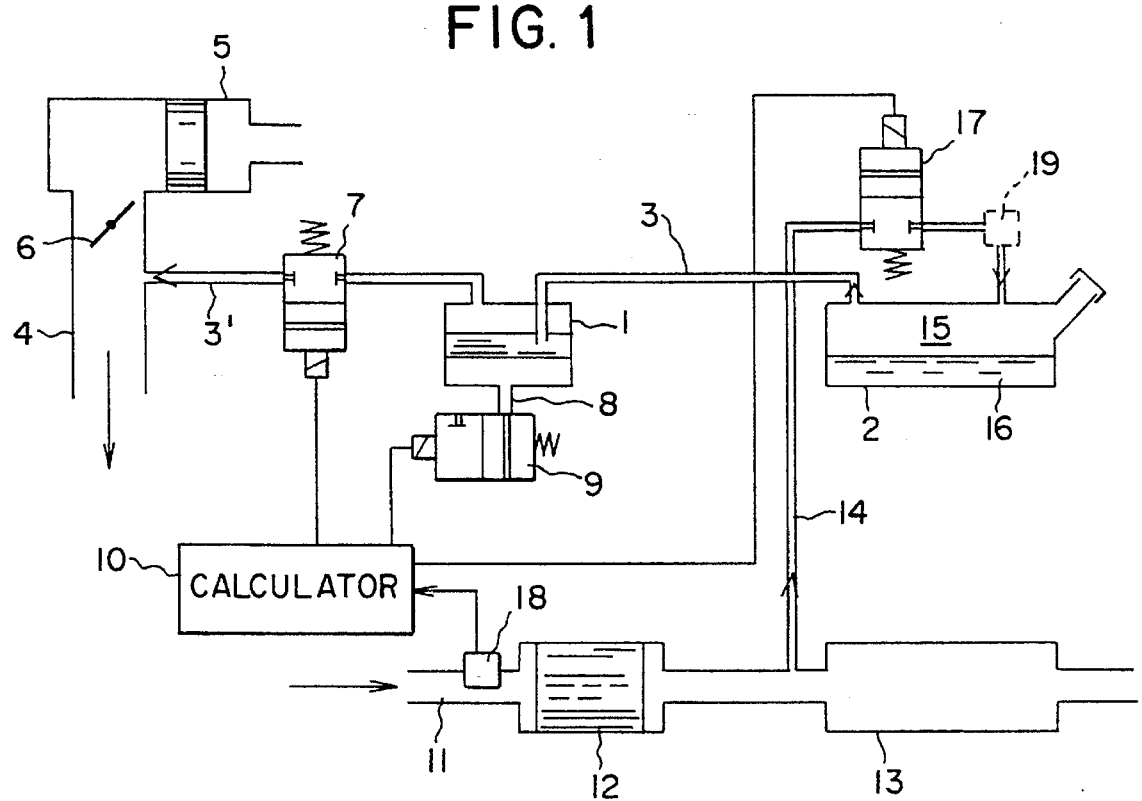

United States Patent [19]

Atanasyan

[11] Patent Number: 5,533,493
[45] Date of Patent: Jul. 9, 1996

[54] METHOD AND DEVICE FOR VERIFYING THE OPERATING CONDITION OF A SYSTEM FOR RECOVERING VAPORS ORIGINATING FROM THE FUEL TANK OF A MOTOR VEHICLE

[75] Inventor: Alain A. Atanasyan, Tournefeuille, France

[73] Assignee: Siemens Automotive, S.A., Toulouse Cedex, France

[21] Appl. No.: 119,208

[22] PCT Filed: Mar. 3, 1992

[86] PCT No.: PCT/EP92/00463

§ 371 Date: Sep. 21, 1993

§ 102(e) Date: Sep. 21, 1993

[87] PCT Pub. No.: WO92/16735

PCT Pub. Date: Oct. 1, 1992

[30] Foreign Application Priority Data

Mar. 21, 1991 [FR] France ................... 91 03426

[51] Int. Cl.$^6$ ............ F02M 25/08; F02M 25/07; F02D 41/14
[52] U.S. Cl. ................................ 123/698; 123/520
[58] Field of Search ................... 123/518, 519, 123/520, 698; 73/117.3, 118.1

[56] References Cited

FOREIGN PATENT DOCUMENTS

| 411173 | 2/1991 | European Pat. Off. . |
| 2635823 | 3/1990 | France . |
| 4012111 | 3/1991 | Germany . |
| 9011443 | 10/1990 | WIPO . |
| 9013738 | 11/1990 | WIPO . |

OTHER PUBLICATIONS

"Patent Abstracts of Japan", vol. 12, No. 305(M–733), Aug. 19, 1988, abstract of JP-A-63080033.

*Primary Examiner*—Tony M. Argenbright
*Attorney, Agent, or Firm*—Herbert L. Lerner; Laurence A. Greenberg

[57] ABSTRACT

A method and device for verifying the operating condition of a system for recovering vapors from a vehicle fuel tank. A vapor cartridge is insulated from the outside air and the vapor circuit of the recovery system is connected, on the one hand, to the intake port of the engine and, on the other hand, to an outlet line for the exhaust gases from the engine. The device selectively activates insulation and connection valves to sweep the cartridge with exhaust gas. Richness in oxygen of the air-fuel mixture supplied to the engine is then measured and compared with a predetermined value in order to deduce the presence of a break in the vapor circuit when the predetermined value is exceeded.

9 Claims, 1 Drawing Sheet

METHOD AND DEVICE FOR VERIFYING THE OPERATING CONDITION OF A SYSTEM FOR RECOVERING VAPORS ORIGINATING FROM THE FUEL TANK OF A MOTOR VEHICLE

The present invention relates to a method and a device for verifying the operating condition of a system for recovering vapours originating from a fuel tank and, more particularly, to such a device designed to be installed in a motor vehicle propelled by an internal combustion engine.

When filling the petrol tank of such a vehicle, or when the petrol contained in this tank is heated up, petrol vapours are released above the free surface of the petrol contained in the tank. These vapours are normally discharged into the open air. However, some antipollution laws insist that these vapours are recovered in order to protect the environment. In order to conform with these laws, vapour-recovering systems have been designed which essentially comprise a cartridge filled with active carbon, the cartridge being connected to the petrol tank so as to collect the hydrocarbon vapours released therefrom, these vapours being absorbed by the active carbon until the latter is saturated.

In order to avoid having to replace the cartridge when the active carbon is saturated, means for regenerating the active carbon are incorporated into the system which operate by sweeping this active carbon with a stream of air. Indeed, the active carbon is regenerated under the action of the oxygen contained in the air which passes through it. In order to effect this sweeping of the active carbon by a stream of air, the cartridge is connected to the intake port of the internal combustion engine which propels the vehicle, the engine then serving as a suction pump. The vapours recycled in this way are then combusted in the engine.

A solenoid valve is conventionally installed between the cartridge and the intake port of the engine. This solenoid valve is controlled by electronic means such as an ignition and/or injection calculator which controls the engine, this calculator furthermore generating a control signal for the solenoid valve which selectively intitiates the connecting of the cartridge to the intake port of the engine, when it is judged to be necessary to empty this cartridge.

The solenoid valve, the cartridge, the petrol tank and the intake port are connected by pipes (or "durit", a trade mark) which can become detached from the elements to which they are connected as a result of being accidentally pulled off or as a result of the vibrations to which the vehicle is subjected, for example. In the event of disconnection, the system for reprocessing petrol vapours becomes, of course, inoperative. The occurrence of such a situation must be detected so that corrective measures may be implemented to prevent the environment from becoming polluted, the petrol vapours otherwise being ejected to the environment when a "durit" has been disconnected.

European Patent Application EP-A-0 411 173 describes a tank ventilation system whereby deficiencies in the system are detected as promptly as possible.

This problem is solved by providing a system for the detection of defects in a tank ventilation system wherein in a line between an output of the filter to an intake portion of the internal combustion engine a flow sensor is arranged which supplies a flow signal to the control unit. A lambda probe may also be provided which supplies a probe signal to the control unit, the lambda probe being provided at an exhaust portion of the internal combustion engine. Means are provided for comparing the at least one of flow signal from the flow sensor or the probe signal from the lambda probe to a control signal which actuates the tank ventilation valve. An error signal is provided in the case of a logically unreasonable comparison of these signals which is indicative of a defect in the tank ventilation system.

French Patent Publication No. 2,635,823, published on Mar. 2, 1990, proposes a device for verifying the operating condition of a system for recovering vapours, comprising means for detecting any possible break in the circuit that the petrol vapours follow, both during the normal absorption of the vapours in the cartridge of active carbon and when this cartridge is being emptied. These means selectively sense the pressure prevailing in the said vapour circuit, when the cartridge is connected to the intake port of the engine, in order to indicate a failure of the circuit when the pressure sensed is greater than a predetermined value. Indeed, in the event of an accidental break in the circuit, the pressure in the latter corresponds to the atmospheric pressure and no longer to the pressure prevailing in the intake port of the engine. By then comparing the pressure in the vapour circuit with a predetermined pressure, in other words, atmospheric pressure, it is possible to detect any break in the vapour circuit, requiring intervention intended to remedy it. According to an advantageous embodiment of the device described in the abovementioned French document, the means for sensing the pressure in the vapour circuit consist of a pressure sensor normally used to supply, to an ignition and/or injection calculator controlling the operation of the engine, the intake pressure of this engine, an essential parameter for the calculations carried out by the calculator. A single pressure sensor is thus used for two purposes, in a particularly economical way.

The device described in the abovementioned French document entails applying a partial vacuum to the petrol tank, normally equipped with an overpressure/depressurising valve. In the event of the latter failing, the application of a partial vacuum to the tank is liable to damage the wall of the tank. Furthermore, the use of the sensor for the intake pressure of the engine to measure the pressure in the tank obviously prevents, during this latter measurement, the intake pressure from being supplied to the ignition and/or injection calculator.

The object of the present invention is thus to provide a method and a device for verifying the operating condition of a system for recovering vapours originating from the fuel tank of a motor vehicle, which do not have the limitations listed above of the device described in the abovementioned French document.

This object of the invention, and others which will become apparent on reading the present description, is achieved with a method for verifying the operating condition of a system for recovering vapours originating from the fuel tank of a motor vehicle propelled by an internal combustion engine, this system comprising a cartridge for recovering these vapours by filtering, placed in a vapour circuit connected, on the one hand, to the fuel tank and capable of being connected selectively, on the other hand, to the intake port of the engine. According to the invention, the cartridge is selectively swept with a stream of gas originating from the exhaust of the engine, the intake port of this engine is supplied with the stream of gas once it has swept the cartridge, the richness in oxygen of the air/fuel mixture which then supplies the engine is measured, and the presence of a break in the vapour circuit is deduced from any exceeding of a predetermined value by the measured richness in oxygen.

Thus, when testing the integrity of the vapour circuit, the engine draws exhaust gases through this circuit. Since the exhaust gases are weak in oxygen, the air entering into the engine is itself weakened in oxygen. Confirmation of this weakening by measuring the richness in oxygen of the air/fuel mixture supplying the engine is then indicative of the fact that no entry of parasitic air, with a normal richness in oxygen, is affecting the vapour circuit.

In order to implement this method, the invention provides a device comprising (a) means for insulating the cartridge from the outside air and for connecting the vapour circuit of the recovering system, on the one hand, to the intake port of the engine and, on the other hand, to an outlet line for the exhaust gases from the engine so as to sweep at least the cartridge with these gases under the effect of the suction developed in the intake port of the engine, (b) means for selectively activating these insulation and connection means, (c) means for then measuring the richness in oxygen of the air/fuel mixture supplying the engine and (d) means for comparing the measured richness with a predetermined value in order to deduce the presence of a break in the vapour circuit from any exceeding of this predetermined value by the measured richness in oxygen.

Figure 2:
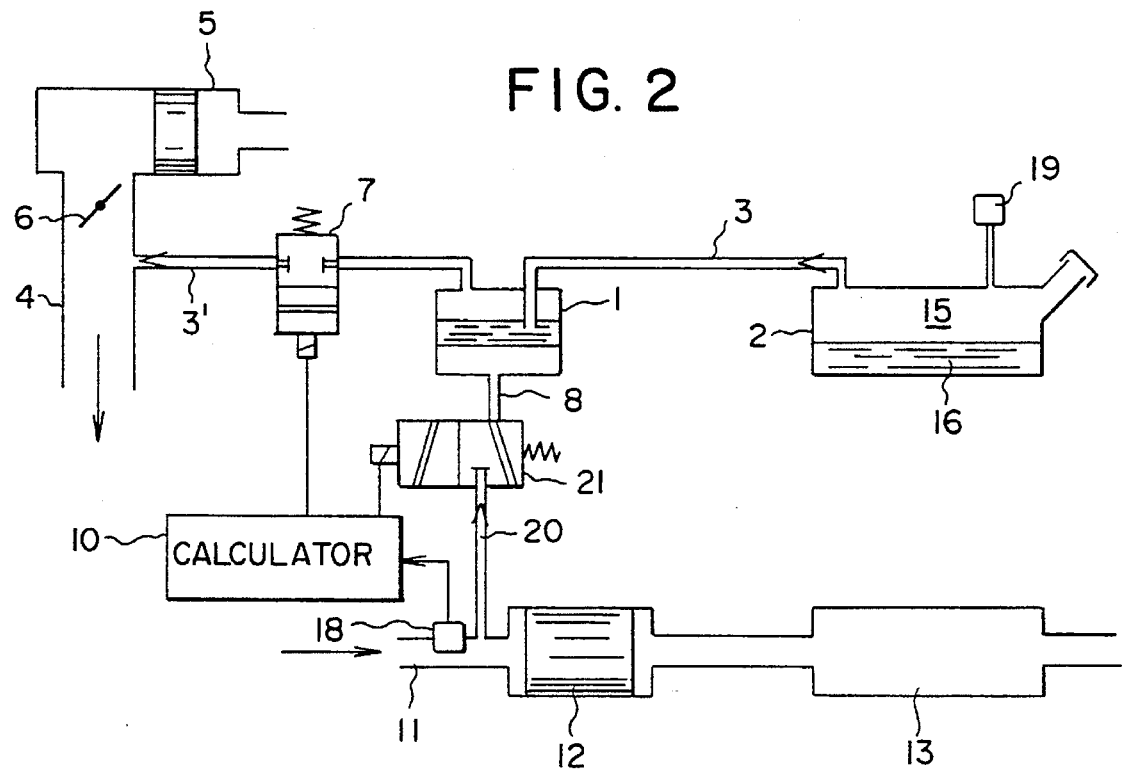

Other features and advantages of the method and of the device according to the invention will become apparent on reading the description which follows and on examining the attached drawing, in which:

FIG. 1 is a diagrammatic representation of a first embodiment of the device according to the invention, and FIG. 2 is a diagrammatic representation of a second embodiment of the device according to the invention.

Reference is made to FIG. 1 of the attached drawing, in which is can be seen that the device according to the invention comprises conventionally, a cartridge 1 for recovering petrol vapour, arranged in a vapour circuit connecting the cartridge 1, on the one hand, to a petrol tank 2 via a duct 3 and, on the other hand, to the intake port 4 of an internal combustion engine via a duct 3'. The intake port 4 of the engine is conventionally equipped with an air filter 5 and with a butterfly valve 6 for regulating the quantity of air entering into the engine. Connection means consisting of a two-orifice and two-position shut-off solenoid valve 7 are arranged in the duct 3' in order to make it possible to control selectively the connection of the cartridge 1 to the intake port 4, as is well known. As is also well known, the cartridge 1 comprises an air inlet 8 that permits sweeping of the cartridge by a stream of air from outside under the effect of a suction developed by the intake port of the engine, during the emptying of the cartridge. According to the invention, insulation means consisting of a two-orifice and two-position solenoid valve 9 are mounted on this air inlet in order to permit the selective control of the opening and the closing of this air inlet. The solenoid valves 7 and 9 are controlled by a calculator 10 on board the vehicle and furthermore comprising, for example, means for controlling ignition and/or for regulating the air/fuel mixture supplying the engine.

According to an essential feature of the device according to the invention, it comprises means for connecting selectively the vapour circuit of the system for recovering petrol vapours described above to an outlet line 11 for the exhaust gases from the engine, which can conventionally comprise a catalytic convertor 12 and a silencer 13 placed in series in the line 11. These connection means can consist of a duct 14 joining the line 11, between the catalytic convertor 12 and the silencer 13, to the space 15 situated above the free surface of the petrol 16 contained in the tank 2. A two-orifice and two-position solenoid valve 17 is placed in the duct 14, this solenoid valve being controlled by the calculator 10.

Also according to the invention, the device comprises means for measuring the richness in oxygen of the air/fuel mixture supplying the engine. When this is controlled by a device for the closed-loop regulation of the air/fuel mixture, such measurement means are normally incorporated into this device and then take the form of an oxygen probe 18 placed in the exhaust line 11 as is well known in practice. The probe 18 then provides a signal to the calculator 10 which controls the regulation device. In order to verify the operating condition of the system for recovering vapours, and in particular the lack of any break in the vapour circuit, in the region of the connections of the duct 3 to the tank and to the cartridge, and of the duct 3' to the same cartridge and to the intake port of the engine, or between these connections, the opening of the solenoid valves 7 and 17 and the closing of the solenoid valve 9 controlling the air inlet of the cartridge 1 are controlled via the calculator 10. The suction thus developed by the intake port 4 of the engine in the tank 2 via the ducts 3 and 3' causes the free space 15 in this tank to be filled with exhaust gases drawn off through the duct 14 from the line 11. These exhaust gases, lean in oxygen, sweep the cartridge 1 before being incorporated, via the duct 3', into the air entering into the engine under the control of the butterfly valve 6. The lowered oxygen content of the air/fuel mixture which then supplies the engine is detected by the oxygen probe 18 which sends to the calculator a signal which is representative of this lowered oxygen content. The calculator comprises means (not shown) for comparing the richness in oxygen of the exhaust gases, which richness is measured by the probe 18, with a predetermined threshold value. When the measured richness falls below this predetermined value, it can be concluded that the vapour circuit has: not been affected by any entry of parasitic air and that, consequently, the system for recovering vapours is functioning correctly.

If, on the other hand, the richness in oxygen measured by the probe 18 is greater than this threshold, it must be concluded that the expected decreased richness of the air/fuel mixture in oxygen has been disturbed by the entry of quantities of parasitic air which has enriched the recycled exhaust gases in the intake port 4 of the engine with oxygen. The entry of quantities of parasitic air in this way normally results, as we have seen above, from disconnections of the ducts 3 and 3' which can become detached from the members to which they are connected as a result of accidentally being pulled off or of vibrations to which the vehicle is subjected, for example. This entry of quantities of air can also result from the ducts 3 and 3' becoming pierced or rupturing, for example owing to aging. In such an eventuality, the calculator excites a visual or sound alarm member, for example, which signals that the system for recovering petrol vapours must be checked urgently with a view to making good the faulty connections or to replacing the pierced or cut ducts.

It is known that the petrol tank 2 can be equipped with an overpressure/depressurising valve which approximately regulates the vapour pressure prevailing in the tank. In an alternative version of the device illustrated in FIG. 1, the duct 14 could be connected to the tank 2 by such an overpressure/depressurising valve 19 (shown diagrammatically in broken lines).

When testing the system for recovering vapours, the device for verifying the operating condition of this system illustrated in FIG. 1 is assigned a certain time constant owing to the fact that the air/fuel mixture entering into the engine only becomes lean in oxygen after the free space 15 of the tank has been emptied and this space has been filled with exhaust gases.

This disadvantage is avoided with the device illustrated in FIG. 2, where reference numerals identical to references used in the device in FIG. 1 refer to identical or similar elements or members. In this figure, it is immediately apparent that the air inlet 8 of the cartridge 1 can be connected selectively to the outlet line 11 for the exhaust gases by a duct 20, the connection being controlled by a two-way and two-position solenoid valve 21, this solenoid valve being controlled by the calculator 10 in the same way as the "emptying" solenoid valve 7. In the position illustrated in FIG. 2, the solenoid valve 21 connects the air inlet 8 to the outside air, whereas, in its other position, it connects this air inlet 8 to the duct 20. In this latter position, used when testing the vapour circuit, the suction developed by the intake port of the engine causes a stream of exhaust gas, lean in oxygen, to pass through the cartridge 1 before recycling this stream into the intake port of the engine. This circulation makes it possible to verify that no air has entered either into the duct 3' or into the duct 3. Indeed, if, despite this duct 3 and the tank 2 not being filled by the exhaust gases drawn through the cartridge 1, parasitic air enters in the region of the duct 3, this parasitic air which has entered is itself drawn in by the intake port through the cartridge and the duct 3'. The oxygen probe 18 does not then detect the decrease in oxygen content which is representative of the lack of any air having entered the vapour circuit.

It may be noted in passing that, in the device in FIG. 2, use is made of the control of only two solenoid valves instead of the three solenoid valves used in the device in FIG. 1.

The invention is not, of course, limited to the embodiments described and illustrated which have been given purely by way of example. The invention can thus be applied to any vehicle equipped with an oxygen probe, whether this vehicle is equipped with a catalytic convertor or not.

What is claimed is:

1. A method for verifying an operating condition of a system for recovering vapors originating from a fuel tank of a motor vehicle propelled by an internal combustion engine, wherein the system includes a vapor circuit, a filter cartridge for recovering the vapours, the filter cartridge being connected in the vapor circuit and communicating with the fuel tank, and a sensor for measuring a richness in oxygen in an exhaust gas of the engine, the method which comprises:

selectively connecting the filter cartridge to an intake port of the engine;

sweeping a stream of exhaust gas from the engine through the filter cartridge and supplying the stream of gas from the filter cartridge to the intake port;

detecting a richness in oxygen of an air/fuel mixture supplying the engine; and deducing that a break exists in the vapor circuit if the richness in oxygen detected by the sensor exceeds a predetermined threshold value.

2. In a recovering system for recovering vapors originating from a fuel tank of a motor vehicle propelled by an internal combustion engine, wherein the recovering system includes a vapor circuit, and a filter cartridge for recovering the vapors, the filter cartridge being connected in the vapor circuit and communicating with the fuel tank, a device for verifying an operating condition of the recovering system, comprising:

sensor means for measuring a richness in oxygen of an exhaust gas of the engine;

means for selectively connecting the filter cartridge to an intake port of the engine;

means for comparing a measured richness in oxygen measured by said sensor means with a predetermined value and for deducing that a break exists in the vapor circuit if the measured value exceeds the predetermined value;

means for isolating the filter cartridge from air outside the vapor circuit, communication means for connecting said vapor circuit to an exhaust gas outlet line for the exhaust gas from the engine and for sweeping said cartridge with the exhaust gas under an effect of a suction developed in the intake port of the engine, and activating means for selectively activating said isolating means.

3. The device according to claim 2, wherein the vehicle has means for closed-loop regulation of an air/fuel mixture supplying the engine, and wherein said sensor means for measuring the richness in oxygen of the air/fuel mixture include an oxygen probe forming a part of the closed-loop regulation means.

4. The device according to claim 2, wherein said filter cartridge has an air inlet opening, said communication means including a duct joining the exhaust gas outlet line to said air inlet opening and valve means for selectively connecting said duct to said air inlet and isolating said filter cartridge from outside air.

5. The device according to claim 4, wherein said activating means are a calculator receiving signals from said sensor means, said valve means being in the form of a solenoid valve controlled by said calculator.

6. The device according to claim 2, wherein the vehicle has a fuel tank with an inner free space defined above a fuel level in the fuel tank, said communication means including a duct joining the exhaust gas outlet line to the inner free space for filling said inner free space and said vapor circuit with exhaust gas under a suction developed in the intake port of the engine.

7. The device according to claim 6, including a solenoid valve for selectively connecting the fuel tank to the exhaust gas outlet line.

8. The device according to claim 6, including an overpressure/depressurizing valve connected in said duct between the fuel tank and the exhaust gas outlet line.

9. The device according to claim 7, including an overpressure/depressurizing valve connected in said duct between the fuel tank and said solenoid valve.

\* \* \* \* \*